United States Patent
Gowda

(10) Patent No.: US 11,553,248 B2
(45) Date of Patent: Jan. 10, 2023

(54) SYSTEM AND METHOD FOR THE ACCESS AND ROUTING OF CONTENT ON THE BASIS OF FACIAL RECOGNITION

(71) Applicant: ARRIS ENTERPRISES LLC, Suwanee, GA (US)

(72) Inventor: Sunil Kumar Puttaswamy Gowda, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/473,475

(22) Filed: Sep. 13, 2021

(65) Prior Publication Data

US 2022/0103900 A1    Mar. 31, 2022

Related U.S. Application Data

(60) Provisional application No. 63/083,225, filed on Sep. 25, 2020.

(51) Int. Cl.
| | |
|---|---|
| *H04N 21/442* | (2011.01) |
| *H04N 5/247* | (2006.01) |
| *H04N 21/45* | (2011.01) |
| *H04N 21/4223* | (2011.01) |
| *H04N 21/436* | (2011.01) |
| *G06V 40/50* | (2022.01) |
| *G06V 40/16* | (2022.01) |

(52) U.S. Cl.
CPC ..... *H04N 21/44218* (2013.01); *G06V 40/172* (2022.01); *G06V 40/50* (2022.01); *H04N 5/247* (2013.01); *H04N 21/4223* (2013.01); *H04N 21/43615* (2013.01); *H04N 21/4532* (2013.01)

(58) Field of Classification Search
CPC ............. H04N 21/44218; H04N 5/247; H04N 21/4223; H04N 21/43615; H04N 21/4532; G06V 40/172; G06V 40/50
See application file for complete search history.

(56) References Cited

U.S. PATENT DOCUMENTS

| | | | |
|---|---|---|---|
| 6,968,565 B1 * | 11/2005 | Slaney ................. | H04N 21/812 348/E7.061 |
| 8,619,148 B1 | 12/2013 | Watts et al. | |
| 10,194,204 B1 * | 1/2019 | Don ....................... | G06Q 10/02 |
| 10,313,731 B1 * | 6/2019 | Krishnan ........... | H04N 21/4532 |
| 2005/0063566 A1 | 3/2005 | Beek et al. | |
| 2009/0074261 A1 | 3/2009 | Haupt et al. | |

(Continued)

OTHER PUBLICATIONS

International Search Report and Written Opinion for Application No. PCT/US2021/050100 dated Dec. 17, 2021.

*Primary Examiner* — Fernando Alcon
(74) *Attorney, Agent, or Firm* — Botos Churchill IP LLP

(57) ABSTRACT

A system and method for controlling the display of video content upon one or more displays as a function of user identity as determined by facial recognition. The system and method provide for the video content to be transferred between multiple screens so as to provide a user with a substantially continuous video experience as the user travels between screen locations. User images captured by both video and still image cameras can be utilized for purposes of user recognition. One or more media hubs may be utilized in performing and supporting the disclosed technology.

18 Claims, 5 Drawing Sheets

(56) References Cited

U.S. PATENT DOCUMENTS

| | | | |
|---|---|---|---|
| 2011/0069940 A1* | 3/2011 | Shimy | G11B 27/105 386/296 |
| 2011/0162018 A1* | 6/2011 | Dodd | H04N 21/43622 725/78 |
| 2012/0206337 A1 | 8/2012 | Hildreth et al. | |
| 2016/0057497 A1* | 2/2016 | Kim | H04N 21/4223 725/10 |
| 2016/0217319 A1 | 7/2016 | Bhanu et al. | |
| 2016/0248766 A1* | 8/2016 | Tembey | H04L 63/102 |
| 2016/0261915 A1* | 9/2016 | Niebres | H04N 21/4318 |
| 2017/0332140 A1* | 11/2017 | Blake | H04N 21/23113 |
| 2020/0236152 A1* | 7/2020 | Bradley | H04L 65/602 |
| 2020/0275151 A1* | 8/2020 | Xiong | H04N 21/44218 |
| 2020/0296468 A1* | 9/2020 | Wittke | H04N 21/4751 |
| 2020/0296469 A1* | 9/2020 | Wittke | H04N 21/44008 |
| 2021/0120204 A1* | 4/2021 | Senapati | H04N 21/44218 |
| 2021/0120300 A1* | 4/2021 | Arling | H04N 21/44227 |
| 2021/0136447 A1* | 5/2021 | Daw | H04N 21/43078 |

* cited by examiner

SYSTEM AND METHOD FOR THE ACCESS AND ROUTING OF CONTENT ON THE BASIS OF FACIAL RECOGNITION

CROSS-REFERENCE TO RELATED APPLICATION

This application claims the benefit of U.S. Provisional Patent Application No. 63/083,225, filed Sep. 25, 2020, which is incorporated by reference herein in its entirety.

BACKGROUND OF THE INVENTION

With the advent of ever-increasing computing capacity in consumer electronics and the proliferation of digital camera technology in computers, telephones and other household devices, the use of facial recognition for purposes of identifying a given user or users of a particular product or system has become a common-place occurrence. Facial recognition technology has advanced to point where positive recognition of an individual can be accomplished so quickly that it appears to be almost instantaneous to a user.

The use of facial recognition throughout more and more areas of consumer technology has resulted in users becoming more and more comfortable with the technology. Something that might have seemed cumbersome, intrusive and even unreliable when implemented on older systems, has now become a means of recognition that a significant portion of consumers not only accept, but desire as a means of providing access to personal devices, information and services.

Recent years have also seen the continued expansion of broadband consumer media services throughout the world. It is not uncommon for a given household to have multiple broadband media gateway appliances ("MGAs"), such as set-top boxes adapted to provide bidirectional communication with a cable, fiber or satellite multi-service operator ("MSO"). Each of these MGAs is typically linked to one or more screens (computers, televisions, tablets, smartphones) via which a consumer can view selected media content. The number of media sources a consumer can access via a given MSO has continued to increase. It is common for MSO MGAs to provide a consumer with access to commercial networks, on-demand video and a host of streaming providers (Amazon, Hulu, Netflix, etc.). This multiplicity of media sources has given consumers a wide selection of content to choose from and enabled a more personalized viewing experience to be created.

Consequently, it would be advantageous to provide a system utilizing facial recognition to access particular media content and to provide a recognized viewer with a seamless media experience as they moved about their residence and/or switched the device upon which they were consuming the media.

BRIEF SUMMARY OF THE INVENTION

A system and method for controlling the display of video content upon one or more displays as a function of user identity as determined by facial recognition. The system and method provide for the video content to be transferred between multiple screens so as to provide a user with a substantially continuous video experience as the user travels between screen locations. User images captured by both video and still image cameras can be utilized for purposes of user recognition. One or more media hubs may be utilized in performing and supporting the disclosed technology.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
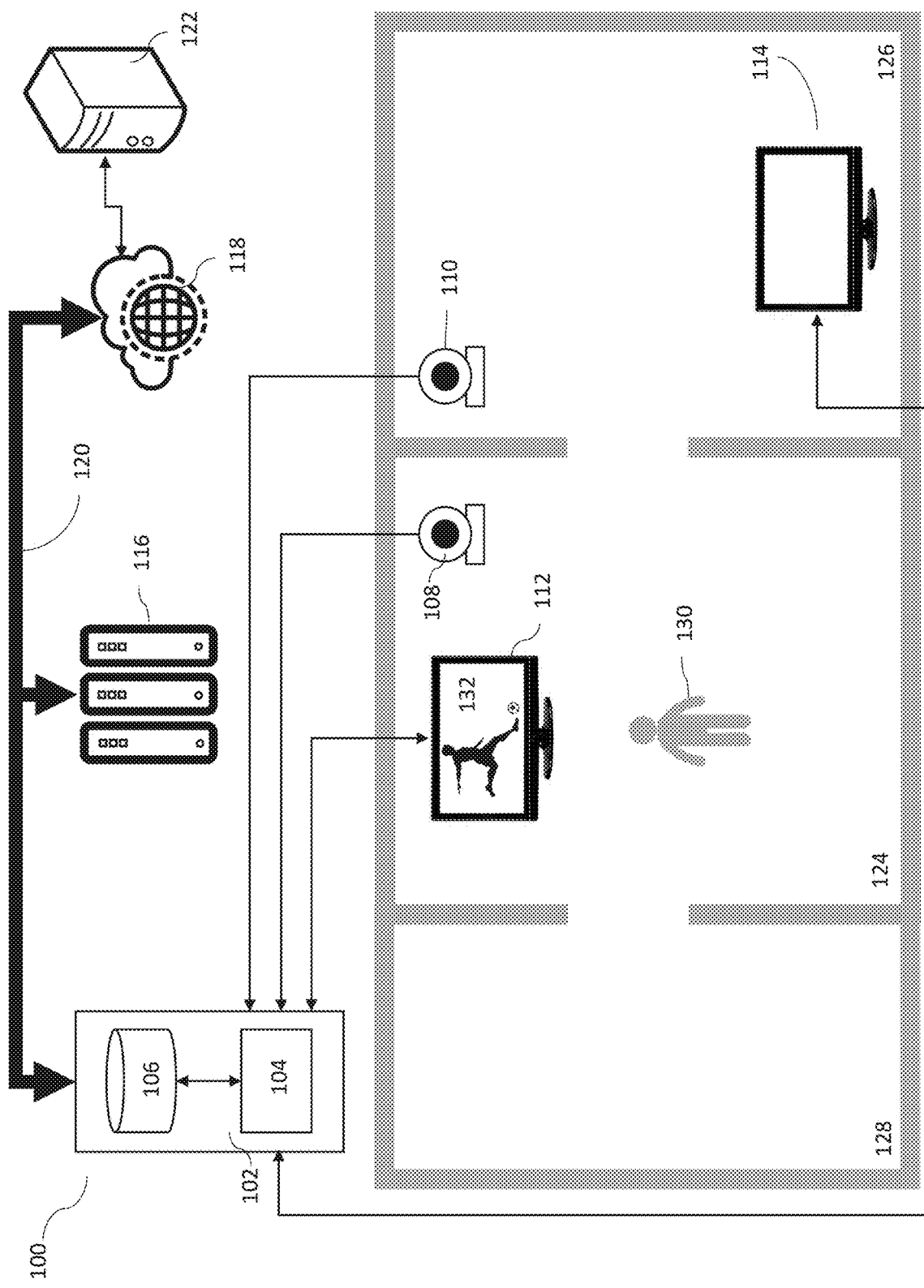
FIG. 1A is a functional block diagram of a first preferred embodiment for a system for accessing and routing content in response to facial recognition showing a user in a first position.

FIG. 1A is a functional diagram of a first preferred embodiment of a system (100) for accessing and routing content in response to facial recognition. System 100 comprises MGA 102 which serves as a controller and nexus for the system. MGA 102 includes processor 104 adapted to run processes that access, format and play video content, memory 106, digital cameras 108 and 110, and digital televisions 112 and 114. In addition, MGA 102 is shown to interface with MSO headend 116 and external network 118 via broadband link 120. External network 118 provides MGA 102 with a link to server 122. As shown, television 112 and digital camera 108 are located in a first room 124, and television 114 and digital camera 110 are located in a second, adjoining room 126. Camera 108 has a field-of-view permitting it to capture images of users within room 124, and camera 110 has a field-of-view permitting it to capture images of users within room 126. These cameras can be either video cameras (collecting a continuous stream of images), or still-image cameras (capturing images at prescribed intervals). In addition, room 128 is also shown to be adjoining to room 124.

Processor 104 is adapted to manage video content received via broadband link 120 or retrieved from memory 106, and selectively display that content on one or both of televisions 112 and 114. Processor 104 is also adapted to receive and process images received from digital cameras 108 and 110. In addition to storing video content, memory 106 is also adapted to store image recognition data derived from the processing of digital camera images.

As shown in FIG. 1A, user 130 is located within room 124. User 130 is utilizing television 112 to view video content 132 (a soccer match). Simultaneously, camera 108 captures images of user 130. These images are processed by processor 104 to extract facial recognition data identifying user 130, and this data is stored in memory 106. Processor 104 will continue to display video content 132 on television 112 until processor 104 determines that facial recognition data identifying user 130 can no longer be extracted from the images received from camera 108; the lack of such facial recognition data being indicative of user 130 no longer being present in room 124.

Figure 1B:
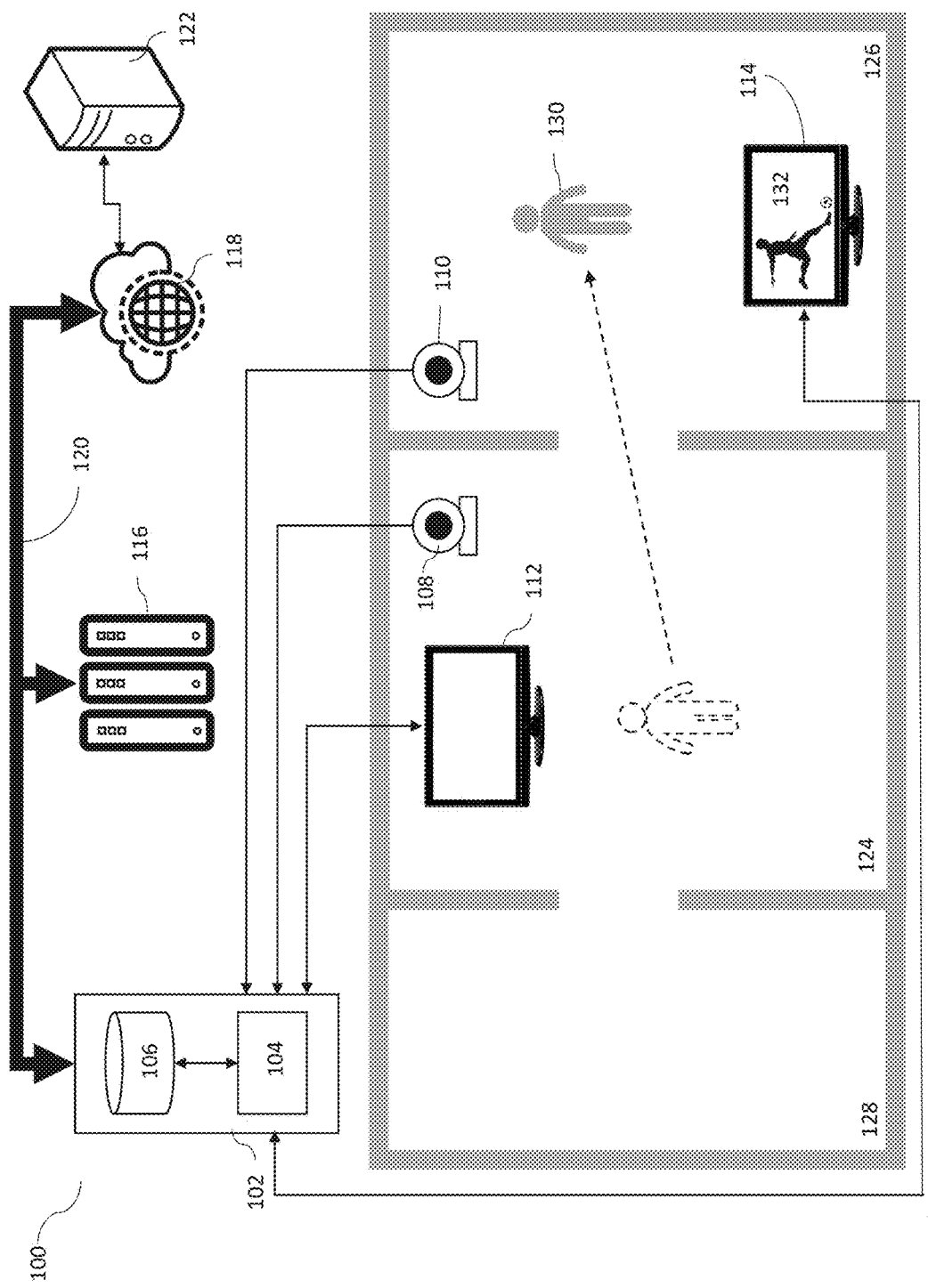
FIG. 1B is a functional block diagram of the system of FIG. 1A showing a user in a second position.

FIG. 1B depicts a scenario where user 130 has traveled from room 124 into adjoining room 126. As user 130 leaves the field-of-view of camera 108, processor 104 determines that facial recognition data identifying user 130 can no longer be extracted from the images captured by camera 108. However, as user 130 enters room 126 images captured by camera 110 yield facial recognition data indicative of user 130. In response, processor 104 terminates the display of video content 132 on television 112 and causes it to be displayed on television 114. The video content will continue to be displayed upon television 114 until the system fails to extract facial recognition data indicative of user 130 from images captured by camera 110, or until a receiving a user command (such as from a remote control) to terminate the display of such.

Figure 1C:
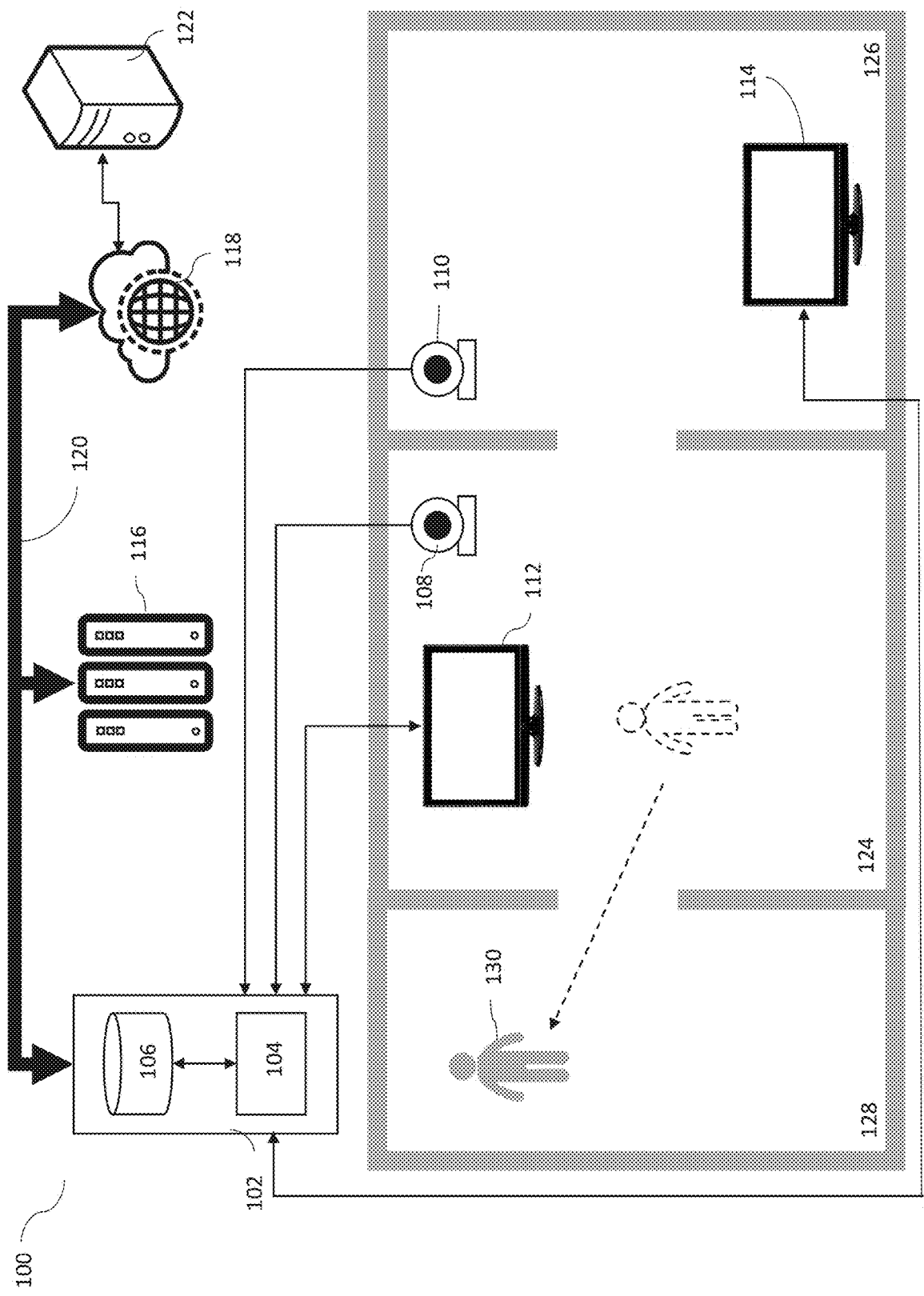
FIG. 1C is a functional block diagram of the system of FIG. 1A showing a user in a third position.
Figure 1D:
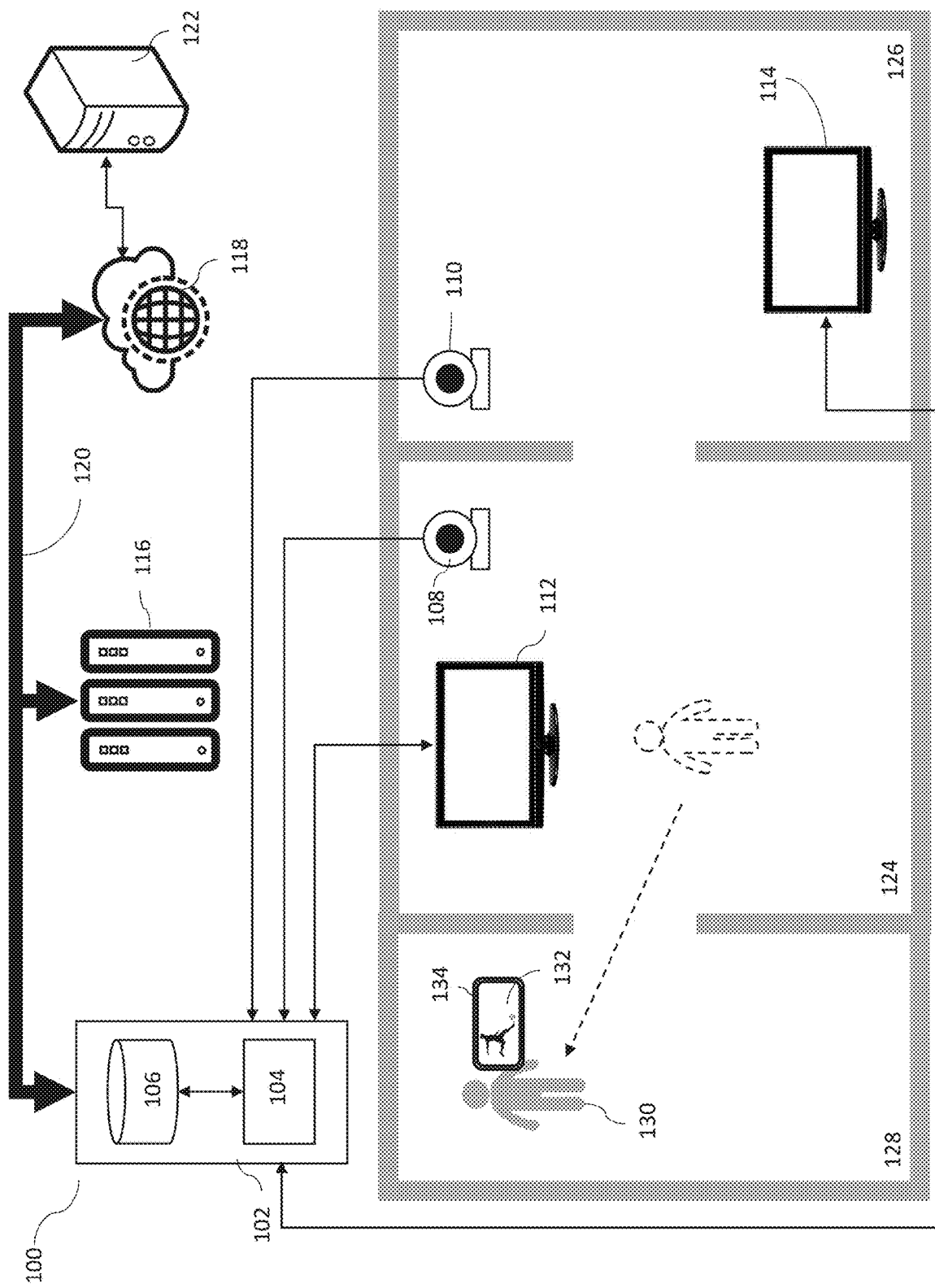
FIG. 1D is a functional block diagram of the system of FIG. 1A showing a user in a third position and utilizing a wireless display device.

If user 130, while viewing video content 132 in room 124, had chosen to travel into adjoining room 128 (see FIG. 1C), processor 104 would cease display video content 132 on television 112 when it was determined that facial recognition data identifying user 130 could no longer be extracted from the images received via camera 108. As there is no television or display linked to MGA 102 in room 128, display of video content 132 would cease. However, if as shown in FIG. 1D, user 132 was in possession of a wireless display device (134), such as a smartphone, tablet or laptop computer, processor 104 would provide video content 132 upon device 134 in response as a consequence of user 130 being out of the field-of-view of both camera 108 and 110. The video content would be transmitted to device 134 wirelessly. This wireless transmission could originate from MGA 102 via a local wireless network (802.X Wi-Fi), or from a cellular or other wireless network linked to headend 116 or network 118.

The determination that a user has left the field-of-view of a particular camera could be dependent upon the inability of processor 104 to extract and recognize facial recognition data identifying a particular user from images received over a predetermined period of time. For example, if user 130 remained in room 124, but turned away from camera 108 for a short period of time, the termination of video content being displayed on television 112 would likely not be desirable. Processor 104 could be programmed to terminate the displayed video only after a failure to extract facial recognition data identifying user 130 was absent from images collected by camera 108 over a time period greater than some arbitrary interval (for example, 5 seconds). This would permit user 130 to move naturally about room 124 without inadvertently causing the termination desired video content.

Figure 2:
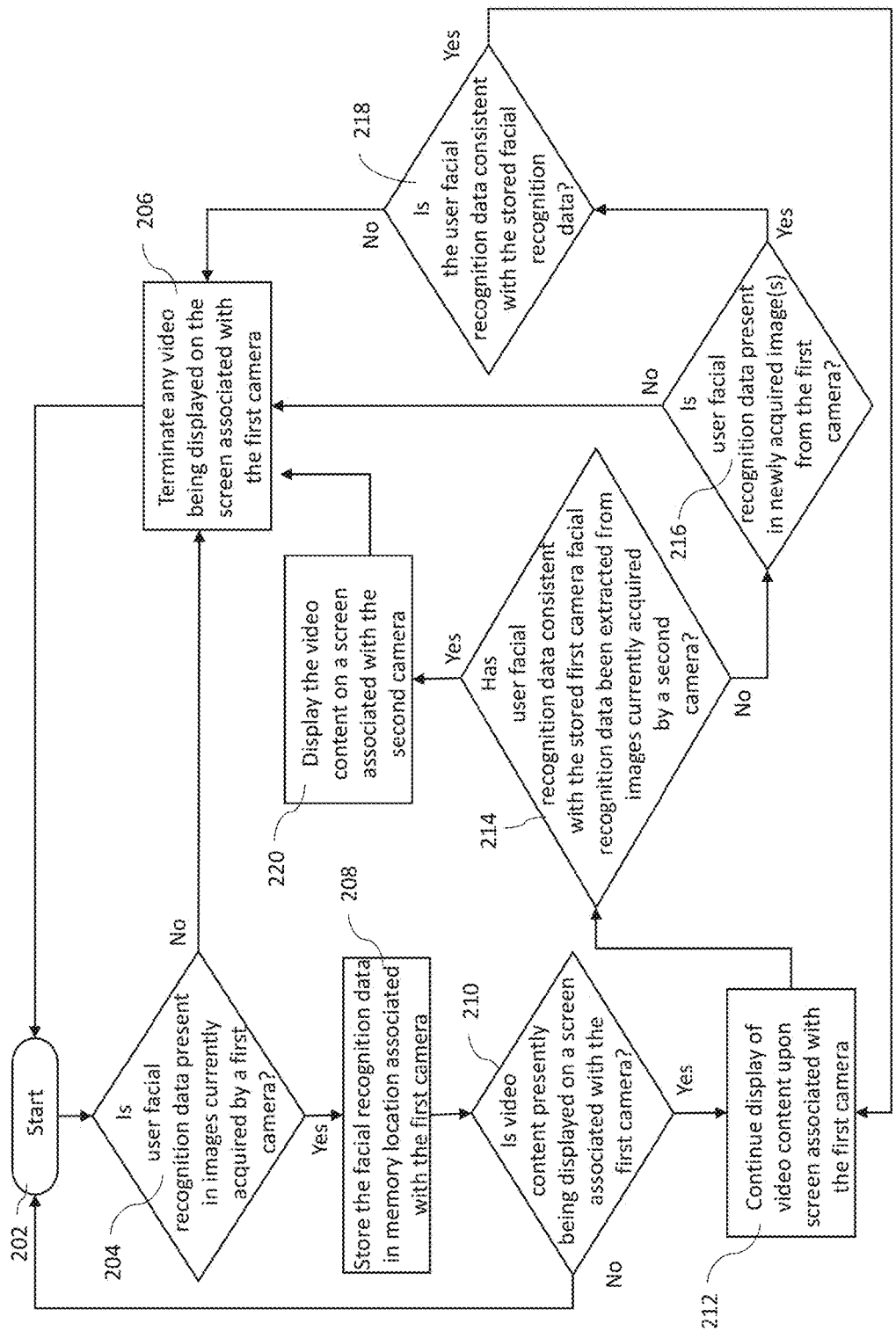
FIG. 2 is a is a flow diagram of a preferred process implemented upon the system of FIG. 1A.

The basic process system 100 utilizes is shown in FIG. 2. Upon initializing (step 202), the system determines if facial recognition data has been successfully extracted from an image or sequence of images currently being captured by a first camera (step 204). If no such data has been extracted, the process continues with step 206 and any video being displayed on a screen or screens associated with the first camera is terminated (step 206). The process then loops back to step 204 to test if facial recognition data is present in newly acquired first camera images.

If at step 204 it is determined that facial recognition data has successfully been extracted from an image or images currently acquired by the first camera, the facial recognition data is stored in memory at a location associated with the first camera (step 208). The system then determines if video content is presently being displayed on a screen or screens associated with the first camera (step 210). If not, the process loops back to step 204 to test if facial recognition data is present in newly acquired first camera images. However, if video content is being displayed, the display is continued (step 212) and the system determines if facial recognition data consistent with the stored first camera facial recognition data has been extracted from an image or images newly acquired by a second camera (step 214).

If no such data has been extracted, the process continues with step 216 and newly captured images from the first camera are analyzed for facial recognition data. If no such data is capable of being extracted from the new image(s), the process continues with step 206 and any video being displayed on a screen or screens associated with the first camera is terminated. If in step 216 facial recognition data is successfully extracted from the newly acquired first camera image(s), the process continues with step 218 and the system determines if the new facial recognition data is consistent with first camera facial recognition data stored in memory. If the new data and the stored data are consistent, the process continues with step 212 and the present video content continues to be displayed on the screen(s) associated with the first camera (the same user is still within the field-of-view of the first camera). If the new data and the stored data are not found to be consistent, the process continues with step 206 and any video being displayed on a screen or screens associated with the first camera is terminated (the user has exited from the first camera's field-of-view).

In step 214, if it is determined that facial recognition data consistent with the stored first camera facial recognition data has been extracted from an image or images newly acquired by a second camera, the system displays the video content presently being displayed on the screen associated with the first camera upon a screen or screens associated with the second camera (step 220) and terminates the display of the content upon the screen associated with the first camera (step 206). The process shown in FIG. 2 then continues with the second camera assuming the role and function of the first camera.

System 100 can be further adapted to provide user-specific functionality and based upon information stored in memory 106 and facial recognition data extracted from images collected by cameras 108 and 110. User specific information, such as that provided in Table A below, can be stored in memory 106:

TABLE A

| User | Display Video Content upon User Recognition? | Follow User? | Terminate Display of Video Content upon failure of User Recognition? | Initial Video Content |
|---|---|---|---|---|
| Able | No | Yes | Yes | Channel Guide |
| Baker | No | No | Yes | Last Content |
| Charlie | No | Yes | No | Home Page |

The storage of this information can be accomplished via users using a graphical user interface presented upon a display (television, computer, smart device, etc.) linked to MGA 102, or by an MSO via broadband link 120. As shown above, the table reflects system preferences for three registered users—Able, Baker and Charlie. Memory 106 is also adapted to store facial recognition data associated with each of the three registered users. This stored facial recognition data enables the system to recognize each of the users within images captured by cameras 108 and 110.

The system has been instructed to initiate the display of video content upon the extraction of facial recognition data associated with user Able. Consequently, when facial recognition data extracted from images received from camera 108 or camera 110 are determined by processor 104 to be consistent with the stored facial recognition data associated with user Able, processor 104 will turn on the television co-located with that camera and initiate the display of video content thereupon. The content displayed can be a guide, a menu, the last channel or stored content that user Able accessed—This particular source for the content being specified by information stored in memory 106. This content information may be specified by a user or by the MSO. As shown in Table A, the initial content to be displayed for user Able is a Channel Guide.

The system has also been programmed to enable the video content being viewed by Able to follow him or her. This means as Able travels from one room to another, the video will be displayed on an appropriate display (if one is available) so as to provide Able with a practically continuous video experience.

Table A also shows that the system is programmed to terminate the display of video content when processor 104 determines that facial recognition data extracted from images received from camera 108 or camera 110 are no longer consistent with the stored facial recognition data associated with user Able. If the system determines that Able cannot be positively identified as being in a room with an accessible video display, the display of video content associated with Able will be terminated.

The profile for registered user Baker instructs the system not to initiate any video display when Baker is recognized, and not to cause video content being watched by Baker to follow him or her from room to room. However, the system has been programmed to display the "Last Content" viewed by Baker when Baker initiates viewing. This could be the last channel, last on-line content, last streaming provider, etc. The system has also been programmed to terminate the display of video content when processor 104 determines that Baker cannot be positively identified as being in a room with an accessible video display.

Yet another preference profile is stored in memory 106 for registered user Charlie. The profile instructs the system not to initiate any video display when Charlie is recognized, but to cause any video content being watched by Charlie to follow him or her from room to room. The system has been programmed to display Charlie's "Home Page" when viewing is initiated. This home page could consist of a particular set of menu choices that have been selected by or customized for user Charlie. The system will not terminate the display of video content when processor 104 determines that Charlie cannot be positively identified as being in a room with an accessible video display. This user may often watch video content with groups of family or friends and may not want their viewing experience interrupted if he/she departs from the viewing room.

Although the invention herein has been described with reference to particular embodiments, it is to be understood that these embodiments are merely illustrative of the principles and applications of the present invention. For example, the links between the MGA and the cameras can be wireless. The MGA can include an integrated camera. Individual MGAs can be placed in separate viewing rooms or areas, each associated with at least one camera and adapted to form a network within which facial recognition information is aggregated so as to enable the above described invention. The network can be linked via wired and/or wireless connections. In addition, the processing described as being performed within a given MGA could also be performed at a remote server or headend linked to one or more MGAs by a broadband connection (wired or wireless). Furthermore, the user preferences listed in Table A are merely examples of what could be employed and referenced within the invention. It will be understood that additional user preferences and parameters could be implemented, including but not limited to content preferences associated with a specific viewing day, date or time, content rating restrictions, specific actions to be taken when more than one user is detected (user priority rankings, etc.). All of the above variations and reasonable extensions therefrom could be implemented and practiced without departing from the spirit and scope of the present invention as defined by the appended claims.

The invention claimed is:

1. A system for the display of video content, the system comprising:
    a first camera adapted to capture user images within a field-of-view associated with a first display;
    a second camera adapted to capture user images within a field-of-view associated with a second display;
    at least one memory adapted to store user facial recognition data and user-defined system preference information associated with said user facial recognition data; and
    at least one processor adapted to process and selectively route video content to first and second video displays, wherein the at least one processor is further adapted to:
        extract first facial recognition data from user images captured by the first camera and store the extracted first facial recognition data in a first memory location associated with the first display;
        extract second facial recognition data from user images captured by the second camera and store the extracted second facial recognition data in a second memory location associated with the second display;
        analyze the first and second facial recognition data;
        retrieve user-defined system preference information based, at least in part, upon the analysis of the first and second facial recognition data; and
        route video content being displayed upon the first display to the second display based upon the analysis of the first and second facial recognition data and the retrieved user-defined system preference information.

2. The system of claim 1 wherein the routing of the video content comprises terminating the display of video content upon the first display.

3. The system of claim 1 wherein at least one of the first and second displays comprises at least one of the following:
    a smartphone;
    a tablet;
    a television; and
    a computer.

4. The system of claim 1 wherein at least one of the first and second cameras is integral to the at least one media gateway.

5. The system of claim 1 wherein at least one of the first and second cameras comprises at least one of the following:
    a video camera; and
    a still image camera.

6. The system of claim 1 wherein the at least one processor is integral to a media gateway appliance.

7. The system of claim 1 wherein the stored user-defined system preference information comprises at least one of:
    content preference;
    content guide;
    a menu; and at least one media gateway appliance functional instruction.

8. The system of claim 1 wherein the at least one processor is remotely located from the first and second displays and linked to the displays by at least one network.

9. The system of claim 8 wherein the network comprises the Internet.

10. A method for the processing and selectively routing video content in a system comprising:
   a first camera adapted to capture user images within a field-of-view associated with a first display;
   a second camera adapted to capture user images within a field-of-view associated with a second display;
   at least one memory adapted to store user facial recognition data and user-defined system preference information associated with said user facial recognition data; and
   at least one processor, the method comprising the steps of:
      extracting first facial recognition data from user images captured by the first camera;
      extracting second facial recognition data from user images captured by the second camera;
      analyzing the first and second facial recognition data;
      retrieving user-defined system preference information based, at least in part, upon the analysis of the first and second facial recognition data; and
      routing video content being displayed upon the first display to the second display based upon the analysis of the first and second facial recognition data and the retrieved user-defined system preference data.

11. The method of claim 10 wherein the routing of the video content further comprises the step of terminating the display of video content upon the first display.

12. The method of claim 10 wherein at least one of the first and second displays comprises at least one of the following:
   a smartphone;
   a tablet;
   a television; and
   a computer.

13. The method of claim 10 wherein at least one of the first and second cameras is integral to the at least one media gateway.

14. The method of claim 10 wherein at least one of the first and second cameras comprises at least one of the following:
   a video camera; and
   a still image camera.

15. The method of claim 10 wherein the at least one processor is integral to a media gateway appliance.

16. The method of claim 10 wherein the at least one processor is remotely located from the first and second displays and linked to the displays by at least one network.

17. The method of claim 10 wherein the system further comprises at least one memory and wherein the steps further comprise:
   storing the extracted first facial recognition data in a first memory location associated with the first display; and
   storing the extracted second facial recognition data in a second memory location associated with the first display.

18. The method of claim 10 wherein the stored user-defined system preference information comprises at least one of:
   content preference;
   content guide;
   a menu; and
   at least one media gateway appliance functional instruction.

* * * * *